United States Patent
Leirich

(10) Patent No.: US 10,434,962 B2
(45) Date of Patent: Oct. 8, 2019

(54) METHOD FOR DETECTING A ROLLOVER OF A MOTOR VEHICLE

(71) Applicant: CONTINENTAL AUTOMOTIVE GMBH, Hannover (DE)

(72) Inventor: Oskar Leirich, Mintraching (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/841,160

(22) Filed: Dec. 13, 2017

(65) Prior Publication Data

US 2018/0105126 A1    Apr. 19, 2018

Related U.S. Application Data

(63) Continuation of application No. PCT/DE2016/200023, filed on Jan. 20, 2016.

(30) Foreign Application Priority Data

Jun. 15, 2015   (DE) .................. 10 2015 210 968

(51) Int. Cl.
*B60R 16/023* (2006.01)
*G07C 5/00* (2006.01)
*B60W 30/04* (2006.01)

(52) U.S. Cl.
CPC .......... *B60R 16/0233* (2013.01); *G07C 5/008* (2013.01); *B60W 30/04* (2013.01); *B60W 2030/043* (2013.01)

(58) Field of Classification Search
USPC .......................................... 701/45
See application file for complete search history.

(56) References Cited

U.S. PATENT DOCUMENTS

| | | | | |
|---|---|---|---|---|
| 2002/0019719 A1* | 2/2002 | Kueblbeck | ............ | B60R 21/013 702/147 |
| 2002/0120380 A1* | 8/2002 | Hambsch | .............. | B60R 21/013 701/45 |
| 2004/0176897 A1* | 9/2004 | Williams | ............ | B60R 21/0132 701/70 |
| 2006/0058934 A1* | 3/2006 | Le | ....................... | B60R 21/0132 701/38 |
| 2009/0024282 A1* | 1/2009 | Roehm | ............... | B60R 21/0134 701/45 |
| 2010/0036597 A1* | 2/2010 | Fiedler | ................ | B60G 17/019 701/124 |
| 2010/0211245 A1* | 8/2010 | Tichy | .................. | B60R 21/0132 701/31.4 |
| 2013/0253729 A1* | 9/2013 | Takahashi | ........... | B60R 21/0132 701/1 |
| 2015/0274160 A1* | 10/2015 | Lee | ........................ | B62D 6/002 701/41 |
| 2018/0105126 A1* | 4/2018 | Leirich | ............... | B60R 16/0233 |
| 2018/0244230 A1* | 8/2018 | Gortsas | ............... | B60R 21/0132 |

FOREIGN PATENT DOCUMENTS

| | | |
|---|---|---|
| DE | 19632363 C1 | 1/1998 |
| DE | 10019418 A1 | 10/2001 |
| DE | 10235567 A1 | 2/2004 |
| DE | 602004006609 T2 | 9/2007 |
| DE | 102008040295 A1 | 1/2010 |
| DE | 102009041187 A1 | 2/2011 |
| DE | 102010008954 A1 | 8/2011 |
| EP | 1157899 A2 | 11/2001 |
| EP | 1312515 A1 | 5/2003 |
| WO | 2007033853 A1 | 3/2007 |

OTHER PUBLICATIONS

International Search Report and Written Opinion dated Jun. 13, 2016 from corresponding International Patent Application No. PCT/DE2016/200023.
German Search Report dated Nov. 2, 2015 for corresponding German Patent Application No. 10 2015 210 968.2.
Russian Office Action dated May 20, 2019 for corresponding Application No. 2017134491.

* cited by examiner

Primary Examiner — Tyler D Paige

(57) ABSTRACT

A method for detecting a rollover on the basis of a signal of an acceleration sensor in the direction of the vertical axis of the vehicle is described, wherein the time period in which acceleration lies within a specified range is assessed. For this purpose, a counter and a clock generator are provided, wherein the counter is incremented each clock pulse if acceleration lies within a specified range, and the counter is decremented maximally to the value of zero if acceleration lies outside of a specified range. An emergency call may be triggered if a specified counter reading is reached. Additionally, a maximum speed may be specified in the travel direction above which the counter or the triggering is not active.

19 Claims, No Drawings

METHOD FOR DETECTING A ROLLOVER OF A MOTOR VEHICLE

CROSS REFERENCE TO RELATED APPLICATION

This application claims the benefit of International application No. PCT/DE2016/200023, filed Jan. 20, 2016, which claims priority to German patent application No. 10 2015 210 968.2, filed Jun. 15, 2015, each of which is hereby incorporated by reference.

TECHNICAL FIELD

The technical field relates to a method for detecting a rollover of a motor vehicle.

BACKGROUND

For several decades, rollovers of motor vehicles have been of particular importance with respect to the activation of restraint means for passenger protection, wherein, in particular, angular rate sensors are used that enable angular momenta of the motor vehicle to be detected early and restraint means to be triggered in time, wherein weak points with it consist in the fact that the absolute angle about the travel direction axis is not taken into account in case of doubt (e.g., due to an inclined pavement) and in an offset drift and an acceleration sensitivity of these angular rate sensors. Thus, slow rotations are hardly detectable. Moreover, the costs of such angular rate sensors are significant.

As such, it is desirable to present a method for detecting a rollover of a vehicle without the use of an angular rate sensor. In addition, other desirable features and characteristics will become apparent from the subsequent summary and detailed description, and the appended claims, taken in conjunction with the accompanying drawings and this background.

DETAILED DESCRIPTION

Methods for detecting a rollover on the basis of a signal of an acceleration sensor (and also for triggering an emergency call) are disclosed that are capable of operating without using any angular rate sensors in case of doubt (see DE 10 2008 040 295 A1, for example). The acceleration in the direction of the vertical axis of the vehicle and, in particular, the time period in which acceleration lies within a specified range are assessed. Specifically, the influence of gravitational force on the acceleration sensor in the vertical axis changes significantly when the vehicle lies on its roof or is in an extremely oblique position.

A counter and a clock generator are provided, the counter is incremented each clock pulse if acceleration lies within a specified range, and the counter is decremented by the value of one each clock pulse if acceleration lies outside of a specified range, wherein the maximum decrement is down to the value of zero, which also corresponds to the initial value.

At it, the specified range is adaptable depending on the respective vehicle and application, but is intended to correspond to a situation in which the vehicle substantially lies on its roof, i.e., in the case of an acceleration sensor in the vertical axis directed toward the ground it is intended to be, e.g., a range of up to at least +1 g if the amount of the loss in gravitational force starts from 0.7 g (normalized base value of −1 g for an upright vehicle; rollover starting from −0.3 g), wherein g is gravitational force.

An emergency call is preferably triggered if a specified counter reading is reached. In contrast to purely temporal assessments, an advantage of such a method consists in the fact that occasional incorrect measured values (each of them being a single error) result in a counter reading value that is incorrect only by the value of one if the counter reading is considerably different from 1 and preferably is at least 10, but have no decisive influence on the overall assessment.

Moreover, in a further development, the counter is incremented only if the speed of the vehicle in the travel direction is lower than a specified maximum speed. Thus, this method detects only rollovers that occur out of normal vehicle operation. However, this is entirely sufficient for an emergency call function.

An alternative provision may be that the counter is incremented but an emergency call is triggered only if the speed of the vehicle in the travel direction is lower than a specified maximum speed.

As a maximum speed, a value below 40 km/h, preferably below or equal to 15 km/h, is provided, wherein these values are only first experimental values and are adaptable according to the respective vehicle application.

As a counter reading for triggering an emergency call, a value is recorded that will be reached at the earliest if acceleration continuously lies within the specified range for, e.g., 500 milliseconds to 4 seconds. If intermediate values deviate, there will be no complete reset but an incremental reduction of the counter so that triggering will occur after a correspondingly longer time period. This final counter value is also adaptable.

In one embodiment, such a counter is purely realized as a software in a control device for a motor vehicle, i.e., a corresponding algorithm is stored in the memory and loaded during operation.

The present disclosure has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for detecting a rollover on the basis of a signal of an acceleration sensor in the direction of the vertical axis of the vehicle on the basis of the time period in which acceleration lies within a specified range, comprising:
   Providing a counter and a clock generator, wherein the counter is incremented each clock pulse if acceleration lies within a specified range, and the counter is decremented maximally to the value of zero if acceleration lies outside of a specified range; and wherein the only sensors used for detecting the rollover has occurred are the counter, the clock generator and the acceleration sensor.

2. The method according to claim 1, wherein an emergency call is triggered if a specified counter reading is reached.

3. The method according to claim 2, wherein a speed sensor for the vehicle is used to measure vehicle speed and the counter is incremented only if the speed of the vehicle in the travel direction is lower than a specified maximum speed.

4. The method according to claim 3, wherein an emergency call is triggered only if the speed of the vehicle in the travel direction is lower than a specified maximum speed.

5. The method according to claim 3, wherein a value below 40 km/h is provided as the specified maximum speed.

6. The method according to claim 3, wherein a value below 15 km/h is provided as the specified maximum speed.

7. The method according claim 2, wherein as a counter reading for triggering an emergency call, a value is recorded that will be reached at the earliest if acceleration continuously lies within the specified range for at least 500 milliseconds.

8. The method according to claim 1, wherein detecting a rollover is independent of using an angular rate sensor.

9. A control device for a motor vehicle comprising:
an algorithm for detecting a rollover on the basis of a signal of an acceleration sensor in the direction of the vertical axis of the vehicle on the basis of the time period in which acceleration lies within a specified range,
wherein a counter and a clock generator are provided, the counter is incremented each clock pulse if acceleration lies within a specified range, and the counter is decremented maximally to the value of zero if acceleration lies outside of a specified range; and
wherein the only sensors used for detecting the rollover has occurred are the counter, the clock generator and the acceleration sensor.

10. The control device of claim 9, wherein an angular rate sensor is not provided.

11. A method for detecting a rollover of a vehicle, said method comprising:
receiving a signal of an acceleration sensor;
receiving a clock pulse;
incrementing a counter each clock pulse in response to the signal from the acceleration sensor indicating that acceleration in the direction of a vertical axis of the vehicle is within a specified range;
decrementing the counter each clock pulse in response to the signal from the acceleration sensor indicating that acceleration in the direction of the vertical axis of the vehicle is outside of the specified range;
determining a rollover has occurred when a specified counter reading is reached; and wherein the only sensors used for detecting the rollover has occurred are the counter, the clock generator and the acceleration sensor.

12. The method according to claim 11, further comprising triggering an emergency call in response to the specified counter reading being reached.

13. The method according to claim 12, wherein a speed sensor for the vehicle is used to measure vehicle speed and incrementing the counter only occurs if the speed of the vehicle in the travel direction is lower than a specified maximum speed.

14. The method according to claim 13, wherein triggering the emergency call occurs only if the speed of the vehicle in the travel direction is lower than a specified maximum speed.

15. The method according to claim 13, wherein the specified maximum speed is a value below 40 km/h.

16. The method according to claim 13, wherein the specified maximum speed is a value below 40 km/h.

17. The method according to claim 13, wherein the specified maximum speed is a value below 15 km/h is provided as the specified maximum speed.

18. The method according to claim 13, further comprising setting a counter reading for triggering an emergency call at a value that will be reached at the earliest if acceleration continuously lies within the specified range for at least 500 milliseconds.

19. The method according to claim 11, wherein detecting a rollover is independent of using an angular rate sensor.

* * * * *